United States Patent Office 3,463,640
Patented Aug. 26, 1969

3,463,640
SUPERSENSITISED SILVER HALIDE EMULSIONS WITH THREE CYANINE DYES
Geoffrey Ernest Ficken, Douglas James Fry, and Elvin Frederick William Thurston, Ilford, England, assignors to Ilford Limited, Ilford, Essex, England, a British company
No Drawing. Filed Dec. 10, 1965, Ser. No. 513,084
Claims priority, application Great Britain, Dec. 17, 1964, 51,358/64; Aug. 19, 1965, 35,643/65
Int. Cl. G03c *1/28*
U.S. Cl. 96—104        8 Claims

ABSTRACT OF THE DISCLOSURE

A photographic silver halide emulsion which contains in sensitising amounts, either 2 dyes of formula:

(I)
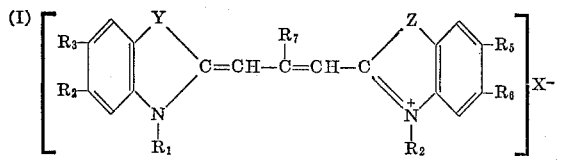

wherein $R_1$ and $R_2$ are the same or different and are alkyl groups or one is alkyl and the other is A-Q where A is alkylene and Q is amide, carboxylic acid or sulphonic acid, $R_3$, $R_4$, $R_5$ and $R_6$ are the same or different and each represents hydrogen, halogen or a hydrocarbon group, $R_7$ is a lower alkyl and Z and Y are each sulphur or selenium atoms and X is an anion; or one dye of Formula I and one dye of Formula II:

(II)
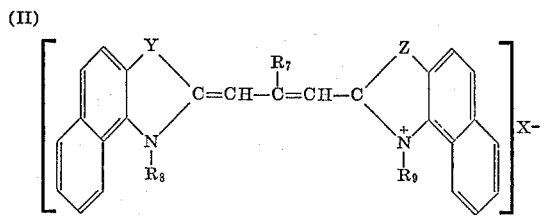

wherein $R_8$ and $R_9$ are alkyl groups and $R_7$, X, Y, and Z have the meanings assigned above; there being present with either combination a dye of the following formula:

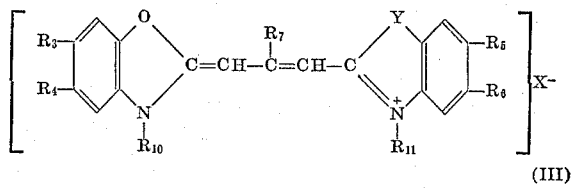

(III)
wherein $R_3$, $R_4$, $R_5$, $R_6$, $R_7$, X and Y have the meanings assigned above, $R_{10}$ is an alkyl group and $R_{11}$ is alkyl or a group A-Q as above.

---

This invention relates to photographic silver light sensitive materials and more particularly in the manufacture of dye-sensitised photographic silver halide emulsions.

Photographic silver halide emulsions have a certain natural sensitivity to light, but this is restricted to a short range of wavelengths in the ultra-violet and/or blue regions of the spectrum. The effect of incorporating a sensitising dye is to impart to the emulsion sensitivity to light of the other wavelengths. It has been known for some years that by incorporating in the emulsion, together with a sensitising dye, a second substance which may or may not itself be a sensitizer, there may be sometimes imparted to the emulsion an additional sensitivity superior to that which may be regarded as the sum effect of the separate substances. Combinations of a sensitising dye and another substance which gives this latter result are known as supersensitising combinations. There has now been discovered a supersensitising combination which comprises three sensitising dyes.

According to the present invention there is provided a photographic silver halide emulsion which comprises, in sensitising amounts, either two sensitising dyes of the general Formula I:

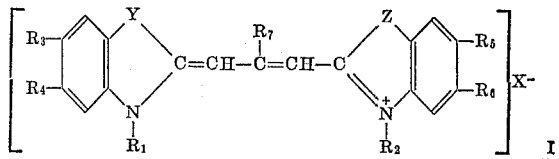

wherein $R_1$ and $R_2$ are the same or different and are alkyl groups, or one is an alkyl group and the other is a group A-Q where A is a straight or branched alkylene chain containing 1–6 carbon atoms and Q is an amide, carboxylic acid or sulphonic acid (where Q is a sulphonic acid the dye generally exists as the anhydro form where X is a hydroxide ion), $R_3$, $R_4$, $R_5$ and $R_6$ are the same or different and each represents a hydrogen atom or a halogen atom, or an alkyl, aryl, hydroxy or alkoxy group, $R_7$ is a lower alkyl group and Y and Z are each sulphur or selenium atoms and X is an anion or one dye of Formula I together with a dye of the following Formula II:

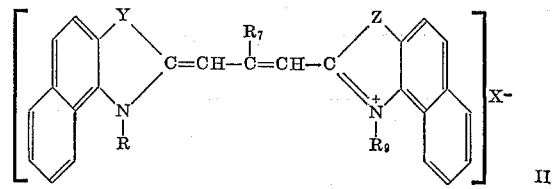

wherein $R_8$ and $R_9$ are alkyl groups and $R_7$, X, Y and Z have the meanings assigned to them above, there being present in the emulsion with either of the two pairs of dyes a sensitising dye of the following Formula III:

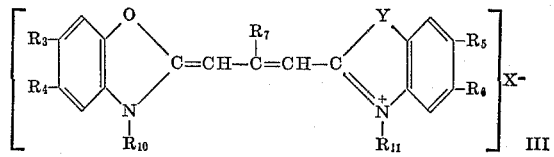

wherein $R_3$, $R_4$, $R_5$, $R_6$, $R_7$, X and Y have the meanings assigned above, $R_{10}$ is an alkyl group and $R_{11}$ is an alkyl group or a group A-Q where A is a straight or branched alkylene chain containing 1–6 carbon atoms and Q is an amide, carboxylic acid or sulphonic acid (where Q is a sulphonic acid the dye generally exists as the anhydro form where X is an hydroxide ion).

In the preferred embodiment of the invention $R_{11}$ in Formula III is a group A-Q where Q is a sulphonic acid group.

In another preferred embodiment of the invention the dye of Formula III is present in the emulsion in a quantity larger than the sum of the other two dyes.

Referring to the general Formulae I, II and III it is to be noted that where alkyl groups are referred to these are preferably lower alkyl groups, i.e., containing 1 to 4 carbon atoms though they may be higher alkyl groups. Where aryl groups are referred to, these may be phenyl or naphthyl and may include substituent groups such as alkyl groups or halogen atoms which do not destroy the sensitising action of the compounds. Examples of alkoxy groups are methoxy and ethoxy.

The symbol X represents any anion (and may be different in different classes of compounds) but generally will be a halide ion or a sulphate, sulphamate, aryl sulphonate or perchlorate ion.

By the use of a combination of these three dyes in an emulsion as just set forth a valuable supersensitising effect is obtained as illustrated by the following examples.

EXAMPLE 1

The following three dyes were used:

Dye of Formula II

Dye A.—Bis-(3-ethyl-2-naphtho[1,2d]thiazole) β-methyltrimethincyanine chloride.

Dye of Formula I

Dye C.—Bis-(3-ethyl-5-methyl-2-benzothiazole) β-ethyltrimethincyanine iodide.

Dye of Formula III

Dye 1.—Anhydro-(3-3'-sulphopropyl - 2 - benzothiazole) (5-methoxy-3-methyl-2-benzoxazole) β-ethyltrimethincyanine hydroxide.

The dyes were added to a high speed silver iodobromide emulsion containing 5.4 mol percent of silver iodide, after digestion of the emulsion, the quantity shown for each dye being the amount per 1½ g. mols of silver halide. The speeds are relative log speeds measured to light passing through a tricolour red filter. The term "relative log speed" is directly related to the logarithm of the reciprocal of the exposure in metre candle seconds required to produce a density of 0.1 above fog. A higher figure indicates a higher speed.

TABLE 1

| Dye A, g. | Dye C, g. | Dye 1, g. | Relative log speed |
|---|---|---|---|
| | | 0.15 | 4.55 |
| | 0.015 | | 3.50 |
| 0.01 | | | 4.02 |
| | 0.015 | 0.15 | 4.93 |
| 0.01 | | 0.15 | 4.85 |
| 0.01 | 0.015 | | 4.25 |
| 0.01 | 0.015 | 0.15 | 5.09 |

The speed figures demonstrate the superiority of the combination of the three dyes compared with each dye used alone or combined in pairs.

EXAMPLE 2

The following dyes of Formulae I, II and III were used, as in Example 1. In all cases the dyes were added after digestion of the emulsion.

Dyes of Formula II (A) Bis-(3-ethyl-2-naphtho[1,2d]thiazole) β-methyltrimethincyanine chloride.
(B) Bis-(3-ethyl-2-naphtho[1,2d]thiazole) β-ethyltrimethincyanine chloride.

Dyes of Formula I (C) Bis-(3-ethyl-5-methyl-2-benzothiazole) β-ethyltrimethincyanine iodide.
(D) Bis-(3-ethyl-5-methyl-2-benzothiazole) β-methyltrimethincyanine bromide.
(E) (3-2'-carboxyethyl-5-methyl-2-benzoselenazole) (5-chloro-3-ethyl-2-benzothiazole) β-ethyltrimethincyanine iodide.
(F) Anhydro-(5-chloro-3-3'-sulphopropyl-2-benzothiazole) (3-ethyl-5-methyl-2-benzoselenazole) β-ethyltrimethincyanine hydroxide.
(G) Anhydro-(3-3'-sulphopropyl-2-benzothiazole) (3-ethyl-2-benzothiazole) β-methyltrimethincyanine hydroxide.
(H) Anhydro-(3-3'-sulphopropyl-2-benzothiazole) (5-chloro-3-ethyl-2-benzothiazole) β-ethyltrimethincyanine hydroxide.
(I) Anhydro-(5,6-dimethyl-3-3'-sulphopropyl-2-benzothiazole) (5-chloro-3-ethyl-2-benzothiazole) β-ethyltrimethincyanine hydroxide.
(J) Anhydro-(5,6-dimethyl-3-3'-sulphopropyl-2-benzothiazole) (3-ethyl-2-benzothiazole) β-ethyltrimethincyanine hydroxide.
(K) Anhydro-(5-methoxy-3-3'-sulphopropyl-2-benzoselenazole) (3-ethyl-5,6-dimethyl-2-benzothiazole) β-ethyltrimethincyanine hydroxide.
(L) Anhydro-(5,6-dimethyl-3-3'-sulphopropyl-2-benzothiazole) (3-ethyl-5-methoxy-2-benzoselenazole) β-ethyltrimethincyanine hydroxide.
(M) Anhydro-(5-methoxy-3-3'-sulphopropyl-2-benzoselenazole) (5-bromo-3-ethyl-2-benzothiazole) β-ethyltrimethincyanine hydroxide.
(N) Anhydro-(5-methoxy-3-3'-sulphopropyl-2-benzothiazole) (3-ethyl-5-methyl-2-benzoselenazole) β-ethyltrimethincyanine hydroxide.
(O) Anhydro-(5-methoxy-3-3'-sulphopropyl-2-benzothiazole) (3-ethyl-5-methoxy-2-benzothiazole) β-ethyltrimethincyanine hydroxide.
(P) Anhydro-(5-bromo-3-3'-sulphopropyl-2-benzothiazole) (3-ethyl-5-methoxy-2-benzothiazole) β-ethyltrimethincyanine hydroxide.
(Q) Anhydro-(6-chloro-3-3'-sulphopropyl-2-benzothiazole) (6-chloro-3-ethyl-2-benzothiazole) β-ethyltrimethincyanine hydroxide.
(R) Anhydro-(3-4'-sulphobutyl-2-benzothiazole) (5-chloro-3-ethyl-2-benzothiazole) β-ethyltrimethincyanine hydroxide.
(S) Anhydro-(5-bromo-3-3'-sulphopropyl-2-benzothiazole) (3-ethyl-5-methoxy-2-benzothiazole) β-ethyltrimethincyanine hydroxide.
(T) Anhydro-(5-methoxy-3-3'-sulphopropyl-2-benzoselenazole) (3-ethyl-5-methoxy-2-benzoselenazole) β-ethyltrimethincyanine hydroxide.
(U) Anhydro-(5,6-dimethyl-3-2'-sulphoethyl-2-benzothiazole) (3-ethyl-5-methyl-2-benzoselenazole) β-ethyltrimethincyanine hydroxide.
(V) Bis-(3-ethyl-5-methyl-2-benzoselenazole) β-ethyltrimethincyanine iodide.
(W) Anhydro-(5-phenyl-3-3'-sulphopropyl-2-benzothiazole) (5-chloro-3-ethyl-2-benzothiazole) β-ethyltrimethincyanine hydroxide.

Dyes of Formula III (1) Anhydro-(3-3'-sulphopropyl-2-benzothiazole) (5-methoxy-3-methyl-2-benzoxazole) β-ethyltrimethincyanine hydroxide.
(2) Anhydro-(3-3'-sulphopropyl-2-benzothiazole) (3-ethyl-5-phenyl-2-benzoxazole) β-ethyltrimethincyanine hydroxide.
(3) (3-2'-carbamoylethyl-2-benzothiazole) (3-ethyl-5-phenyl-2-benzoxazole) β-ethyltrimethincyanine iodide.
(4) (3-ethyl-2-benzothiazole) (3-ethyl-5-phenyl-2-benzoxazole) β-ethyltrimethincyanine iodide.
(5) (3-2'-carboxyethyl-2-benzothiazole) (3-ethyl-5-phenyl-2-benzoxazole) β-ethyltrimethincyanine perchlorate.
(6) (3-2'-carboxyethyl-2-benzothiazole) (5-methoxy-3-methyl-2-benzoxazole) β-ethyltrimethincyanine bromide.
(7) Anhydro-(5-methoxy-3-3'-sulphopropyl-2-benzothiazole) (5-methoxy-3-methyl-2-benzoxazole) β-ethyltrimethincyanine hydroxide.
(8) Anhydro-(3-3'-sulphopropyl-2-benzothiazole) (3-methyl-5-phenyl-2-benzoxazole) β-ethyltrimethincyanine hydroxide.
(9) Anhydro-(3-4'-sulphobutyl-2-benzothiazole) (3-ethyl-5,6-dimethyl-2-benzoxazole) β-ethyltrimethincyanine hydroxide.
(10) Anhydro-(5,6-dimethyl-3-3'-sulphopropyl-2-benzothiazole) (5-chloro-3-ethyl-2-benzoxazole) β-ethyltrimethincyanine hydroxide.
(11) Anhydro-(5-chloro-3-3'-sulphopropyl-2-benzothiazole)(5-methoxy-3-methyl-2-benzoxazole) β-ethyltri-methincyanine hydroxide.
(12) Anhydro-(3-4'-sulphobutyl-2-benzoselenazole)(3-ethyl-5-phenyl-2-benzoxazole) β-ethyltrimethincyanine hydroxide.

TABLE 2

| Dye | Grams | Dye | Grams | Dye | Grams | Rel. log speed |
|---|---|---|---|---|---|---|
| A | | C | | 2 | 0.15 | 4.15 |
| | | | 0.05 | | | 4.15 |
| | 0.05 | | | | | 4.56 |
| | | | | | 0.15 | 4.80 |
| | | | 0.05 | | 0.15 | 5.00 |
| | 0.05 | | 0.05 | | | 4.87 |
| | 0.05 | | 0.05 | | 0.15 | 5.13 |
| B | | C | | 1 | 0.15 | 4.50 |
| | | | 0.05 | | | 4.15 |
| | 0.05 | | | | | 4.64 |
| | | | 0.05 | | 0.15 | 4.95 |
| | 0.05 | | | | 0.15 | 5.10 |
| | 0.05 | | 0.05 | | | 4.83 |
| | 0.05 | | 0.05 | | 0.15 | 5.17 |
| A | | D | | 1 | 0.15 | 4.25 |
| | | | 0.05 | | | 3.75 |
| | 0.05 | | | | | 4.28 |
| | | | 0.05 | | 0.15 | 4.68 |
| | 0.05 | | | | 0.15 | 4.73 |
| | 0.05 | | 0.05 | | | 4.40 |
| | 0.05 | | 0.05 | | 0.15 | 4.80 |
| A | | E | | 1 | 0.15 | 4.65 |
| | | | 0.05 | | | 4.65 |
| | 0.05 | | | | | 4.80 |
| | | | 0.05 | | 0.15 | 5.00 |
| | 0.05 | | | | 0.15 | 5.20 |
| | 0.05 | | 0.05 | | | 5.10 |
| | 0.05 | | 0.05 | | 0.15 | 5.31 |
| A | | F | | 1 | 0.15 | 4.65 |
| | | | 0.05 | | | 4.87 |
| | 0.05 | | | | | 4.80 |
| | | | 0.05 | | 0.15 | 5.19 |
| | 0.05 | | | | 0.15 | 5.20 |
| | 0.05 | | 0.05 | | | 5.19 |
| | 0.05 | | 0.05 | | 0.15 | 5.33 |
| A | | C | | 3 | 0.15 | 3.77 |
| | | | 0.05 | | | 4.40 |
| | 0.05 | | | | | 4.57 |
| | | | 0.05 | | 0.15 | 4.50 |
| | 0.05 | | | | 0.15 | 4.95 |
| | 0.05 | | 0.05 | | | 4.80 |
| | 0.05 | | 0.05 | | 0.15 | 5.08 |
| A | | C | | 4 | 0.15 | 3.97 |
| | | | 0.05 | | | 4.40 |
| | 0.05 | | | | | 4.57 |
| | | | 0.05 | | 0.15 | 4.75 |
| | 0.05 | | | | 0.15 | 4.95 |
| | 0.05 | | 0.05 | | | 4.80 |
| | 0.05 | | 0.05 | | 0.15 | 5.08 |
| A | | C | | 5 | 0.15 | 3.95 |
| | | | 0.05 | | | 4.40 |
| | 0.05 | | | | | 4.57 |
| | | | 0.05 | | 0.15 | 4.65 |
| | 0.05 | | | | 0.15 | 4.80 |
| | 0.05 | | 0.05 | | | 4.80 |
| | 0.05 | | 0.05 | | 0.15 | 5.00 |
| A | | G | | 1 | 0.15 | 4.72 |
| | | | 0.05 | | | 4.38 |
| | 0.05 | | | | | 4.85 |
| | | | 0.05 | | 0.15 | 4.70 |
| | 0.05 | | | | 0.15 | 5.23 |
| | 0.05 | | 0.05 | | | 4.83 |
| | 0.05 | | 0.05 | | 0.15 | 5.28 |
| A | | H | | 1 | 0.15 | 4.95 |
| | | | 0.05 | | | 4.84 |
| | 0.05 | | | | | 4.89 |
| | | | 0.05 | | 0.15 | 5.07 |
| | 0.05 | | | | 0.15 | 5.25 |
| | 0.05 | | 0.05 | | | 5.22 |
| | 0.05 | | 0.05 | | 0.15 | 5.30 |
| A | | I | | 1 | 0.15 | 4.95 |
| | | | 0.05 | | | 5.00 |
| | 0.05 | | | | | 4.89 |
| | | | 0.05 | | 0.15 | 5.20 |
| | 0.05 | | | | 0.15 | 5.25 |
| | 0.05 | | 0.05 | | | 5.25 |
| | 0.05 | | 0.05 | | 0.15 | 5.31 |
| A | | J | | 1 | 0.15 | 4.95 |
| | | | 0.05 | | | 5.02 |
| | 0.05 | | | | | 4.89 |
| | | | 0.05 | | 0.15 | 5.23 |
| | 0.05 | | | | 0.15 | 5.25 |
| | 0.05 | | 0.05 | | | 5.25 |
| | 0.05 | | 0.05 | | 0.15 | 5.33 |

TABLE 2—Continued

| Dye | Grams | Dye | Grams | Dye | Grams | Rel. log speed |
|---|---|---|---|---|---|---|
| C | | K | | 1 | 0.15 | 4.51 |
| | | | 0.05 | | | 4.83 |
| | 0.05 | | | | | 4.20 |
| | | | 0.05 | | 0.15 | 5.09 |
| | 0.05 | | | | 0.15 | 4.87 |
| | 0.05 | | 0.05 | | | 4.95 |
| | 0.05 | | 0.05 | | 0.15 | 5.17 |
| C | | L | | 1 | 0.15 | 4.51 |
| | | | 0.05 | | | 4.75 |
| | 0.05 | | | | | 4.20 |
| | | | 0.05 | | 0.15 | 5.05 |
| | 0.05 | | | | 0.15 | 4.87 |
| | 0.05 | | 0.05 | | | 4.96 |
| | 0.05 | | 0.05 | | 0.15 | 5.14 |
| C | | M | | 1 | 0.15 | 4.51 |
| | | | 0.05 | | | 4.55 |
| | 0.05 | | | | | 4.20 |
| | | | 0.05 | | 0.15 | 5.02 |
| | 0.05 | | | | 0.15 | 4.87 |
| | 0.05 | | 0.05 | | | 4.79 |
| | 0.05 | | 0.05 | | 0.15 | 5.15 |
| C | | N | | 1 | 0.15 | 4.51 |
| | | | 0.05 | | | 4.84 |
| | 0.05 | | | | | 4.20 |
| | | | 0.05 | | 0.15 | 5.07 |
| | 0.05 | | | | 0.15 | 4.87 |
| | 0.05 | | 0.05 | | | 4.90 |
| | 0.05 | | 0.05 | | 0.15 | 5.12 |
| A | | C | | 6 | 0.15 | 4.45 |
| | | | 0.05 | | | 4.25 |
| | 0.05 | | | | | 4.77 |
| | | | 0.05 | | 0.15 | 4.84 |
| | 0.05 | | | | 0.15 | 5.00 |
| | 0.05 | | 0.05 | | | 4.93 |
| | 0.05 | | 0.05 | | 0.15 | 5.09 |
| A | | C | | 7 | 0.15 | 4.84 |
| | | | 0.95 | | | 4.40 |
| | 0.05 | | | | | 4.70 |
| | | | 0.05 | | 0.15 | 5.06 |
| | 0.05 | | | | 0.15 | 5.14 |
| | 0.05 | | 0.05 | | | 4.86 |
| | 0.05 | | 0.05 | | 0.15 | 5.31 |
| A | | Q | | 1 | 0.15 | 4.72 |
| | | | 0.05 | | | 4.02 |
| | 0.05 | | | | | 4.85 |
| | | | 0.05 | | 0.15 | 4.89 |
| | 0.05 | | | | 0.15 | 5.23 |
| | 0.05 | | 0.05 | | | 5.04 |
| | 0.05 | | 0.05 | | 0.15 | 5.26 |
| A | | R | | 1 | 0.15 | 4.95 |
| | | | 0.05 | | | 4.80 |
| | 0.05 | | | | | 4.89 |
| | | | 0.05 | | 0.15 | 5.09 |
| | 0.05 | | | | 0.15 | 5.25 |
| | 0.05 | | 0.05 | | | 4.78 |
| | 0.05 | | 0.05 | | 0.15 | 5.27 |
| A | | C | | 1 | 0.15 | 4.75 |
| | | | 0.05 | | | 4.25 |
| | 0.05 | | | | | 4.77 |
| | | | 0.05 | | 0.15 | 5.20 |
| | 0.05 | | | | 0.15 | 5.23 |
| | 0.05 | | 0.05 | | | 4.93 |
| | 0.05 | | 0.05 | | 0.15 | 5.25 |

EXAMPLE 3

The method of Example 1 was followed except that the dyes in the first column of Table 3 were added to the emulsion before digestion, and the dyes in the second and third column were added after digestion.

TABLE 3

| Dye | Grams | Dye | Grams | Dye | Grams | Rel. log speed |
|---|---|---|---|---|---|---|
| C | | O | | 1 | 0.20 | 4.60 |
| | | | 0.01 | | | 4.35 |
| | 0.015 | | | | | 3.50 |
| | | | 0.01 | | 0.20 | 4.80 |
| | 0.015 | | | | 0.20 | 4.87 |
| | 0.015 | | 0.01 | | | 4.60 |
| | 0.015 | | 0.01 | | 0.20 | 5.00 |
| C | | P | | 1 | 0.20 | 4.58 |
| | | | 0.01 | | | 4.30 |
| | 0.015 | | | | | 3.35 |
| | | | 0.01 | | 0.20 | 4.75 |
| | 0.015 | | | | 0.20 | 4.80 |
| | 0.015 | | 0.01 | | | 4.74 |
| | 0.015 | | 0.01 | | 0.20 | 4.92 |
| C | | E | | 8 | 0.175 | 4.21 |
| | | | 0.02 | | | 3.74 |
| | 0.025 | | | | | 3.50 |
| | | | 0.02 | | 0.175 | 4.80 |
| | 0.025 | | | | 0.175 | 4.58 |
| | 0.025 | | 0.02 | | | 4.71 |
| | 0.025 | | 0.02 | | 0.175 | 5.00 |

TABLE 3.—Continued

| Dye | Grams | Dye | Grams | Dye | Grams | Rel. log speed |
|---|---|---|---|---|---|---|
| C | | A | | 9 | 0.175 | 3.25 |
| | 0.015 | | 0.01 | | | 3.36 |
| | 0.015 | | | | 0.175 | 2.62 |
| | | | 0.01 | | 0.175 | 3.70 |
| | 0.015 | | 0.01 | | | 3.51 |
| | 0.015 | | 0.01 | | 0.175 | 3.71 |
| | | | | | | 4.03 |
| C | | A | | 10 | 0.175 | 4.11 |
| | 0.015 | | 0.01 | | | 3.36 |
| | 0.015 | | | | 0.175 | 2.62 |
| | | | 0.01 | | 0.175 | 4.35 |
| | 0.015 | | 0.01 | | | 4.45 |
| | 0.015 | | 0.01 | | 0.175 | 3.71 |
| | | | | | | 4.59 |
| C | | A | | 12 | 0.10 | 3.71 |
| | 0.025 | | 0.025 | | | 3.97 |
| | | | | | | 3.01 |
| | 0.025 | | 0.025 | | 0.10 | 4.30 |
| | | | | | 0.10 | 4.18 |
| | 0.015 | | 0.01 | | | 3.71 |
| | 0.015 | | 0.01 | | 0.10 | 4.37 |
| A | | S | | 1 | 0.20 | 4.31 |
| | 0.015 | | 0.035 | | | 4.11 |
| | | | | | | 2.70 |
| | 0.015 | | 0.035 | | 0.20 | 4.55 |
| | | | | | 0.20 | 4.60 |
| | 0.015 | | 0.02 | | | 4.29 |
| | 0.015 | | 0.02 | | 0.20 | 4 |
| A | | T | | 1 | 0.20 | 4.31 |
| | 0.015 | | 0.035 | | | 4.03 |
| | | | | | | 2.70 |
| | 0.015 | | 0.035 | | 0.20 | 4.61 |
| | | | | | 0.20 | 4.60 |
| | 0.015 | | 0.02 | | | 4.23 |
| | 0.015 | | 0.02 | | 0.20 | 4.68 |
| A | | U | | 1 | 0.20 | 4.20 |
| | 0.015 | | 0.035 | | | 3.70 |
| | | | | | | 2.50 |
| | 0.015 | | 0.035 | | 0.20 | 4.42 |
| | | | | | 0.20 | 4.37 |
| | 0.015 | | 0.02 | | | 3.62 |
| | 0.015 | | 0.02 | | 0.20 | 4.50 |
| V | | M | | 1 | 0.20 | 4.11 |
| | 0.015 | | 0.02 | | | 3.64 |
| | | | | | | 2.72 |
| | 0.015 | | 0.02 | | 0.20 | 4.34 |
| | | | | | 0.20 | 4.42 |
| | 0.015 | | 0.02 | | | 3.64 |
| | 0.015 | | 0.02 | | 0.20 | 4.50 |
| A | | W | | 1 | 0.20 | 4.31 |
| | 0.015 | | 0.035 | | | 3.70 |
| | | | | | | 2.60 |
| | 0.015 | | 0.035 | | 0.20 | 4.70 |
| | 0.015 | | 0.02 | | 0.20 | 4.88 |

We claim as our invention:

1. A photographic silver halide emulsion containing, in sensitising amounts either two sensitising dyes of the general formula:

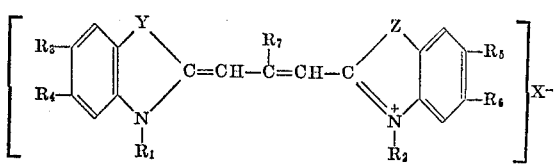

wherein $R_1$ and $R_2$ are the same or different and are alkyl groups, or one is an alkyl group and the other is a group A-Q where A is straight or branched alkylene chain containing 1–6 carbon atoms and Q is an amide, carboxylic acid or sulphonic acid, $R_3$, $R_4$, $R_5$ and $R_6$ are the same or different and each represents a hydrogen atom or a halogen atom, or an alkyl, aryl, hydroxy or alkoxy group, $R_7$ is a lower alkyl group and Y and Z are each sulphur or selenium atoms and X is an anion but, where Q is sulphonic acid the dye is in the zwitterionic form, or one dye of the above formula together with a dye of the following formula:

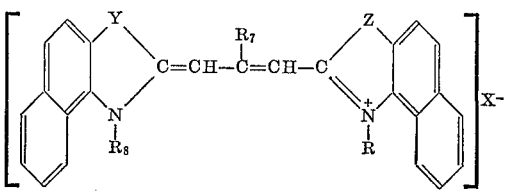

wherein $R_8$ and $R_9$ are alkyl groups and $R_7$, X, Y and Z have the meanings assigned to them above, there being present in the emulsion with either of aforesaid combinations of dyes a sensitising dye of the following formula:

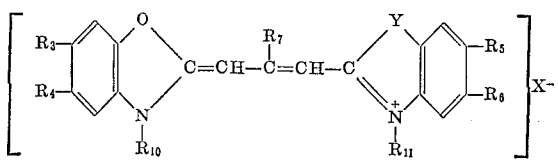

wherein $R_3$, $R_4$, $R_5$, $R_6$, $R_7$, X and Y have the meanings assigned above, $R_{10}$ is an alkyl group and $R_{11}$ is an alkyl group or a group A-Q where A is a straight or branched alkylene chain containing 1–6 carbon atoms and Q has the meaning assigned above.

2. A photographic emulsion according to claim 1 wherein $R_{11}$ in the formula which was last defined is a group A-Q where Q is a sulphonic acid group.

3. A photographic emulsion according to claim 1 wherein the dye of the formula last defined is present in the emulsion in a quantity by weight greater than the sum of the other two dyes.

4. A photographic silver halide emulsion according to claim 1 which contains in sensitising amounts, bis - (3 - ethyl-2-naphtho [1,2d]thiazole) β-methyltrimethincyanine chloride, bis - (3 - ethyl - 5-methyl-2-benzothiazole) β-ethyltrimethincyanine iodide, and anhydro - (3-3'-sulphopropyl-2-benzothiazole) (5-methoxy-3-methyl-2-benzoxazole) β - ethyltrimethincyanine hydroxide.

5. A photographic silver halide emulsion according to claim 1 which contains in sensitising amounts, bis - (3 - ethyl-2-naptho [1,2d]thiazole) 8 - methyltrimethincyanine chloride, bis-(2-ethyl - 5 - methyl - 2 - benzothiazole) β-ethyltrimethincyanine iodide, and anhydro - (5-methoxy-3-3'-sulphopropyl - 2 - benzothiazole) (5-methoxy - 3 - methyl-2-benzoxazole) β-ethyltrimethincyanine hydroxide.

6. A photographic silver halide emulsion according to claim 1 which contains in sensitising amounts, bis-(3-ethyl-5-methyl-2-benzothiazole) β-ethyltrimethincyanine iodide, (3 - 2' - carboxyethyl - 5 - methyl - 2 - benzoselenazole) (5-chloro-3-ethyl-2-benzothiazole) β-ethyltrimethincyanine iodide, and anhydro - (3-3'-sulphopropyl-2-benzothiazole) (3-methyl-5-phenyl-2-benzoxazole) (β - ethyltrimethincyanine hydroxide.

7. A photographic silver halide emulsion according to claim 1 which contains in sensitising amounts, bis - (3 - ethyl - 5 - methyl-2-benzothiazole) β-ethyltrimethincyanine iodide, anhydro - (5 - methoxy-3-3'-sulphopropyl-2-benzothiazole) (3 - ethyl-5-methoxy-2-benzothiazole) β-ethyltrimethincyanine hydroxide, and anhydro - (3 - 3' - sulphopropyl - 2 - benzothiazole) (5 - methoxy - 3-methyl-2-benzoxazole) (β-ethyltrimethincyanine hydroxide.

8. A photographic silver halide emulsion according to claim 1 which contains in sensitising amounts, bis - (3 - ethyl - 5 - methyl - 2 - benzothiazole) β-ethyl-trimethincyanine iodide, anhydro - (5 - bromo - 3-3'-sulphopropyl - 2 - benzothiazole) (3 - ethyl - 5 - methoxy - 2 - benzothiazole) β-ethyltrimethincyanine hydroxide, and anhydro - (3 - 3' - sulphopropyl-2-benzothiazole) (5 - methoxy - 3 - methyl-2-benzoxazole) β-ethyltrimethincyanine hydroxide.

References Cited

UNITED STATES PATENTS

| 2,158,882 | 1/1937 | Mees | 96—104 |
| 3,338,714 | 8/1967 | Ficken et al. | 96—104 |
| 3,348,949 | 10/1967 | Bannert et al. | 96—106 |

J. TRAVIS BROWN, Primary Examiner